(12) United States Patent
Thompson et al.

(10) Patent No.: US 8,429,267 B2
(45) Date of Patent: Apr. 23, 2013

(54) WEB SERVICES ENABLED DEVICE AND BROWSER GADGETS COUPLED WITH DATA STORAGE SERVICE AND WEB PORTAL

(75) Inventors: Gregory A. Thompson, Murfreesboro, TN (US); Tuan Ta, Nolensville, TN (US)

(73) Assignee: Schneider Electric USA, Inc., Palatine, IL (US)

( * ) Notice: Subject to any disclaimer, the term of this patent is extended or adjusted under 35 U.S.C. 154(b) by 763 days.

(21) Appl. No.: 12/215,734

(22) Filed: Jun. 30, 2008

(65) Prior Publication Data

US 2009/0327483 A1 Dec. 31, 2009

(51) Int. Cl.
*G06F 15/173* (2006.01)
(52) U.S. Cl.
USPC ........... 709/224; 709/223; 715/200; 715/234; 340/870.02
(58) Field of Classification Search .................. 709/223, 709/224; 715/200, 234; 340/870.02
See application file for complete search history.

(56) References Cited

U.S. PATENT DOCUMENTS

| | | | | |
|---|---|---|---|---|
| 2002/0147645 A1* | 10/2002 | Alao et al. | ........................ | 705/14 |
| 2003/0212513 A1* | 11/2003 | Vandevanter et al. | .......... | 702/57 |
| 2004/0107025 A1* | 6/2004 | Ransom et al. | ................ | 700/286 |
| 2006/0106741 A1* | 5/2006 | Janarthanan | .................... | 705/412 |
| 2008/0282139 A1* | 11/2008 | Davis | ............................ | 715/205 |

OTHER PUBLICATIONS

Schneider Electric; "Web-Enabled Ethernet Gateway Simplifies Power Utility Monitoring;" Nov. 2003; (2 pages).
Schneider Electric; "Instruction Bulletin, PowerLogic Ethernet Gateway;" Jan. 2006; (16 pages).
Schneider Electric; "Transparent Ready Web-enabled Power and Control;" 2003; (8 pages).
Schneider Electric; "PowerLogic Ion Reference—ION Architecture & ION Modules;" Dec. 2007; (pp. 485-492).

* cited by examiner

*Primary Examiner* — Harunur Rashid
(74) *Attorney, Agent, or Firm* — Nixon Peabody LLP (57) ABSTRACT

A method of presenting structured information, via software gadgets, based on monitored data in a utility monitoring system. First monitored data is exposed to a network to produce, via a first web service, first structured data. The first monitored data is indicative of utility characteristics measured by a first IED in the utility monitoring system. The first structured data is received over the network and second structured data is received from a network-accessible data storage service. The data storage service has a second web service that exposes second monitored data to produce the second structured data. The first structured data is manipulated, in at least one of the software gadgets, to produce structured information based on the first monitored data, and the structured information is communicated from the at least one software gadget to a web browser for display in a web page by the web browser.

13 Claims, 6 Drawing Sheets

WEB SERVICES ENABLED DEVICE AND BROWSER GADGETS COUPLED WITH DATA STORAGE SERVICE AND WEB PORTAL

FIELD OF THE INVENTION

The present invention relates generally to presenting information in a web browser and in particular, to using software gadgets to present structured information based on monitored data in a utility monitoring system as well as from historicized monitored data from a data storage service.

BACKGROUND OF THE INVENTION

Utility systems, such as an electrical utility system, are monitored by a network of intelligent electronic devices ("IEDs") coupled to a computer for monitoring various parameters or characteristics of the electrical utility system. The network of IEDs and the computer are typically referred to collectively as a power monitoring system. Power monitoring systems require software to be installed on the computer with appropriate hard drive storage and communications established to the IEDs. Supporting and deploying software solutions globally is a tremendous challenge as the vendor must design for and test numerous installation and upgrade scenarios. These scenarios can include: different operating system versions, different operating system languages, performance, computer specifications (storage space, processor speed, memory, etc.).

Current technology cannot advantageously provide a total system view of the utility monitoring system as the current technology limits the user interface to accessing only one IP address of a web-enabled IED at a time. Moreover, users cannot presently view information from more than one web-enabled IED without navigating to multiple web pages, thus complicating and frustrating the user's experience.

Typically, the IED's monitored data is read by the software installed on the computer and in turn stored on the computer for local analysis and reporting. This model can be very problematic due to the storage and processing requirements of the software overwhelming the available storage and processing capabilities of the computer. Thus, the Total Cost of Ownership ("TCO") of even a simple system can be relatively high.

Other approaches to this TCO problem have relied upon the software installed on the computer to communicate directly with the IEDs and leverage only the monitored data stored within the IED. While this approach reduces the storage requirement TCO issue, other issues still remain that keep the TCO level too high for the value being provided to the users. For example, IEDs have a limited amount of available memory and a fraction of what storage is available in a computer. The cost to add physical memory is very high due to hardware costs and potential redesign. Even with the price of memory decreasing annually, the cost to retrofit IEDs in the field with the additional memory is usually cost prohibitive to do so.

What is needed is a solution that allows for a utility monitoring system to be deployed with minimal requirements of the user's computer while providing a robust set of features and supporting the long-term reporting/analysis needs of users. What is also needed is a solution that allows for an entry-level utility monitoring solution to be deployed and supported globally using a web browser, IEDs, and a TCP/IP connection. Aspects and embodiments disclosed herein are directed to addressing/solving these and other needs.

SUMMARY OF THE INVENTION

Aspects of this disclosure use software gadgets (sometimes called widgets) to gather and mine monitored data from multiple monitoring devices that may themselves lack the capability to publish their data to an TCP/IP network. The gadgets communicate with IP-compatible web services that pull real-time data from the IEDs, which may be connected via legacy connections, such as Modbus, or historical data stored on a remote data storage service. An important aspect is that all of the web services are IP-compatible and produce data in a common structured format, preferably XML, rendering it easier to query any type of IED, regardless of whatever communication protocol it uses. The web browser can be any web browser that displays the software gadgets and can run on any operating system platform. An important aspect is the ability of the software gadgets to receive real-time data from the IEDs via a gateway or Ethernet-enabled IED and historical data (or real-time data) from a data storage service, wherein the gateway, Ethernet-enabled IED, and data storage service expose the monitored data via IP-compatible web services. By imposing a gateway or Ethernet-enabled IED between the gadget and the IEDs, the system can support a wide range of IED capabilities, from legacy IEDs with very basic communication capability to more sophisticated Ethernet-enabled IEDs. The software gadgets have "knowledge" about the devices they are interrogating for their data, which facilitates a system-level view or perspective of the user's facility.

The aspects disclosed herein avoid the need to develop specialized gadgets that communicate using proprietary communication protocols with a variety of IEDs that are commonly found in any given user's facility. It is common for a user's facility to include a combination of IEDs having varying levels of capabilities and using different communications protocols (some of which may be proprietary) depending upon the application for which the IED is needed within the user's facility or site. The data from all capable IEDs (capable in the sense that they have some ability to communicate their data to another system) is exposed by IP-compatible web services such that the software gadgets only need to connect to the web services, which transmit the requested data from the IEDs to the requesting software gadget.

The data storage service is an Internet-hosted storage system that can be remote from the customer's site or one located within a customer's firewall. Not only can the software gadgets pull real-time data from web services associated with the IEDs, but they can also pull real-time or historical data from the data storage service via an IP-compatible web service. This ability to provide a historical perspective is invaluable for end-users, who need to mine aged data to troubleshoot an event, predict future events, or manage their facility efficiently and effectively.

The software gadgets can be hosted on a widget library over the Internet. They can be purchased and downloaded by a user via the web browser and stored locally in the user's computer, in the gateway, an Ethernet-enabled IED, or a proxy server. New gadgets can simply be uploaded to the customer's web portal for access by multiple users.

According to some aspects, a method of presenting structured information, via software gadgets, based on monitored data in a utility monitoring system includes exposing first monitored data to a network to produce, via a first web service, first structured data. The first monitored data is indicative of characteristics of a utility measured by a first intelligent electronic device (IED) in the utility monitoring system. The method further includes receiving the first structured data over the network and receiving second structured data from a network-accessible data storage service. The network-accessible data storage service has a second web service that exposes second monitored data to produce the second structured data. The second monitored data is indicative of characteristics of the utility measured by a second IED. The method further includes manipulating, in at least one of the software gadgets, the first structured data to produce structured information based on the first monitored data and communicating the structured information from the at least one software gadget to a web browser for display in a web page by the web browser.

According to some aspects, a system for presenting structured information, via software gadgets, based on monitored data in a utility monitoring system includes a device, a gadget library, and a network-accessible data storage service. The device includes a first web service programmed to expose to a network first monitored data indicative of characteristics of a utility measured by a first intelligent electronic device (IED) in the utility monitoring system to produce first structured data. The gadget library stores a plurality of software gadgets, at least one of the plurality of software gadgets is configured to connect over the network to the first web service to receive therefrom the first structured data. The network-accessible data storage service is communicatively coupled to the device. The data storage service is configured to receive second monitored data indicative of characteristics of the utility measured by a second IED. The data storage service includes a second web service to expose the second monitored data to produce second structured data that is network compatible. The at least one of the plurality of software gadgets is configured to connect to the second web service to receive the second structured data, manipulate the first structured data, or the second structured data, or both, to produce corresponding structured information, and communicate the structured information to a web browser for display in a web page by the web browser.

The foregoing and additional aspects and embodiments of the present invention will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the invention will become apparent upon reading the following detailed description and upon reference to the drawings.

DETAILED DESCRIPTION OF THE ILLUSTRATED EMBODIMENTS

Although the invention will be described in connection with certain aspects and/or embodiments, it will be understood that the invention is not limited to those particular aspects and/or embodiments. On the contrary, the invention is intended to cover all alternatives, modifications, and equivalent arrangements as may be included within the spirit and scope of the invention as defined by the appended claims.

Figure 1:
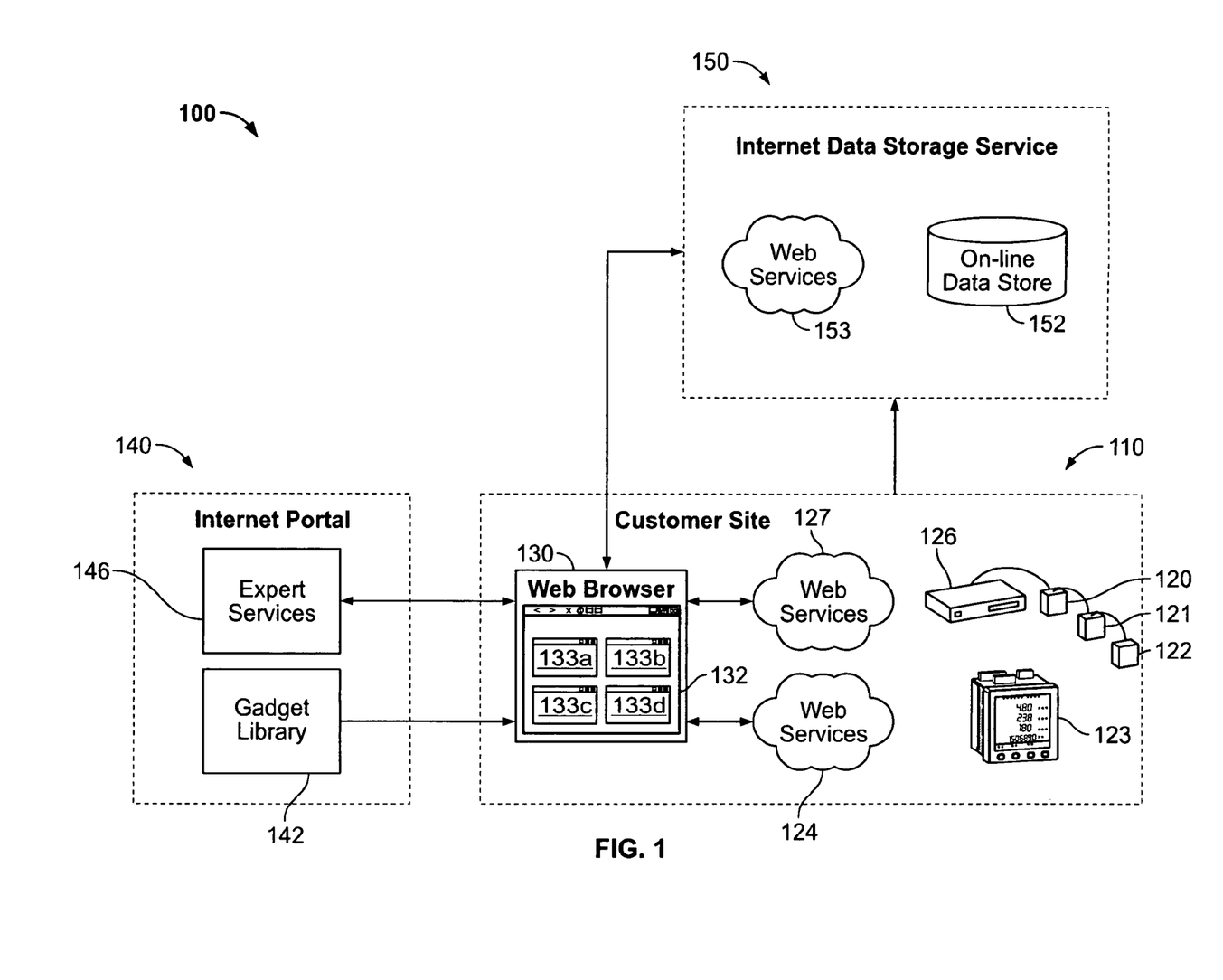
FIG. 1 is a functional block diagram of a system for presenting structured information based on monitored data in a utility monitoring system, which illustrates data flow between various components of the system in accordance with aspects herein.

Turning now to FIG. 1, a system 100 for presenting structured information via software gadgets is generally shown. The system 100 includes a customer site 110, an internet portal 140, and an internet data storage service 150.

The customer site 110 includes a plurality of intelligent electronic devices ("IED") 120-123 and a web browser 130 running on a computer (e.g., computer 231 of FIG. 2) in the customer site. The combination of the plurality of IEDs 120-123 comprises a utility monitoring system for monitoring, for example, electrical characteristics (such as voltage, current, power, harmonics, and the like) of an electrical utility. The monitoring generates monitored data within the IEDs 120-123, and the monitored data is indicative of characteristics of the utility measured by the IEDs 120-123. The plurality of IEDs 120-123 are coupled to the web browser 130 over a network (e.g., customer network 260 of FIG. 2), and the IEDs 120-122 are coupled to the web browser 130 via a gateway 126. The IEDs can be serial IEDs (e.g., IEDs 120-122) that communicate according to a serial communications protocol such as Modbus®, or Ethernet-enabled IEDs (e.g., IED 123), or a combination of both types of IEDs. The serial IEDs 120-122 connect to the network through a gateway 126. The Ethernet-enabled IED 123 connects directly to the network without needing an external gateway. An example of a suitable gateway 126 is the EGX400® Ethernet Gateway available from Square D Company based in Palatine, Ill.

As mentioned above, each IED 120, 121, 122, 123 measures characteristics of the utility system, and quantifies these characteristics into monitored data that can be analyzed by a computer. For example, the monitoring device can measure power, energy, or other characteristics of electricity. In the electrical context, the IED may be based on a PowerLogic® Series 3000/4000 Circuit Monitor or a PowerLogic® ION7550/7650 Power and Energy Meter available from Schneider Electric or any other suitable IED device such as a microprocessor-based circuit breaker, relay, metering device, or power meter. The utility can be any one of WAGES, including water, air, gas, electricity, steam, and weather. In the illustrated aspects herein, the utility is electricity, and the monitoring system is a power monitoring system, but the aspects disclosed herein can be applied to any other monitored utilities.

The gateway 126 includes embedded web services 127. Similarly, the Ethernet-enabled IED 123 includes embedded web services 124. Generally, web services correspond to software designed to support interoperable machine-to-machine interaction over a network. In some aspects, the web services include Web Application Programming Interfaces ("APIs") that can be accessed over a network (e.g., a LAN or the Internet) and executed on a remote system hosting requested services. Specifically, the web services 124, 127 expose the monitored data from the IEDs 120-123 to the network to which the web services are connected. The exposed monitored data can be real-time data from an IED or historical data previously buffered from an IED. The contents of the monitored data may include, but are not limited to, characteristics of electricity, such as current values, voltage values, and power values, and records such as event records, power quality waveform captures, alarm records, setup functions, or any combination thereof. The monitored data can be stored and/or buffered in a memory of the IEDs 120-123, in a memory of the gateway 126, in a memory of a remote server, or in any combination thereof. The web services 127, 124 also convert the monitored data into structured data. The structured data is a decoupled version of the monitored data presented in a structured format, such as XML or JSON.

The web browser 130 displays structured information, which is based on the monitored data. Generally, the web browser 130 enables a user to display and interact with text, images, videos, music, and other information on a web page 132. Specifically, the web page 132 displays software gadgets 133 that the user can interact with in various ways. For example, the user can edit, copy, duplicate, delete, move, rearrange, or setup any particular software gadget 133 displayed in the web browser 130. In some aspects, the user can create or download additional software gadgets 133 for interaction within the web browser 130 or remove existing software gadgets from the web page 132. The software gadgets disclosed herein can be a technical support gadget (users can click on an object displayed by the software gadget to be connected to a technical support representative via a voice-over-IP connection, who has the ability to view the data from the user's IEDs or structured information from any software gadget in the user's web browser), a data backup gadget (the user can backup monitored data onto an external backup storage), a graphical display gadget (a gadget that controls how other gadgets are to be laid out or displayed on the web page), a report gadget (a gadget that displays a report of manipulated data associated with an IED), or a trend gadget (a gadget that displays trending data associated with an IED), to name a few. The software gadgets themselves can be made available for purchase or the content or analysis performed by the software gadget can be made available for purchase. For example, if the user desires to perform a power quality waveform capture, this type of analysis can be purchased by the user via a software gadget. The software gadgets can be written in a JavaScript scripting language or any other web browser compatible technology.

The software gadgets 133 are stored in a computer (e.g., computer 231 of FIG. 2) that hosts the web browser 130. When the user accesses the web page 132, at least some of the locally stored software gadgets 133 are automatically available to the user. According to some aspects, the software gadgets 133 can automatically discover and/or connect to any capable IED in the utility monitoring system. In these aspects, the addition to or removal of an IED from the utility monitoring system does not negatively affect the system 100 and/or operation of the software gadgets 133.

In addition to auto-discovery of IEDs, a user can enter a setup mode of a software-gadget (e.g., software gadget 133*a*). Within the setup mode, the user can point that software gadget to a specific IED (e.g., IED 123) or to two or more IEDs (e.g., IEDs 120 and 123) connected to the system 100 by entering the IP address(es) or URI (uniform resource identifier) of the desired IED or IEDs. As shown in FIG. 1, the software gadgets 133 specifically connect with the web services 124, 127 of the Ethernet-enabled IED 123 and of the gateway 126, respectively. Once the software gadget is pointed to one or more IEDs, the software gadget can receive the structured data corresponding to the monitored data from the addressed IED through the web services 124, 127 and manipulate the structured data to produce the structured information, which is based on the monitored data. By structured information, it is meant that the information is presented in a structured format, preferably XML, and the information has been manipulated from the structured data (also preferably formatted in XML) corresponding to the monitored data. Examples of structured information include tabular displays tabulating the monitored data or charts or graphs depicting the monitored data in a graphical format. By manipulate, it is meant that at a minimum, the structured data is converted to corresponding structured information. More sophisticated or expert manipulation, such as analysis of the structured data to provide predictive or preventative information to the user regarding the monitored data is also contemplated. By way of another example, manipulate can include calculating a value, such as power, from voltage and current data received from an IED.

In some aspects, the web page 132 displays four software gadgets 133*a-d*. The first, second, and third software gadgets 133*a*, 133*b*, and 133*c* connect with the web services 127 of the gateway 126 to receive the structured data, which is derived from the monitored data measured by the IEDs 120, 121, 122, respectively. The fourth software gadget 133*d* connects with the web services 124 of the Ethernet-enabled IED 123 to receive the structured data, which is derived from the monitored data measured by the Ethernet-enabled IED 123. Alternatively, one of the software gadgets 133 can connect with multiple web services. For example, the software gadget 133*a* can connect with the web services 124 of the Ethernet-enabled IED 123 and the web services 127 of the gateway to receive the structured data derived from the monitored data generated within the plurality of IEDs 120-123. Various other amounts and combinations of the software gadgets 133 and the IEDs 120-123 are contemplated.

Figure 3:
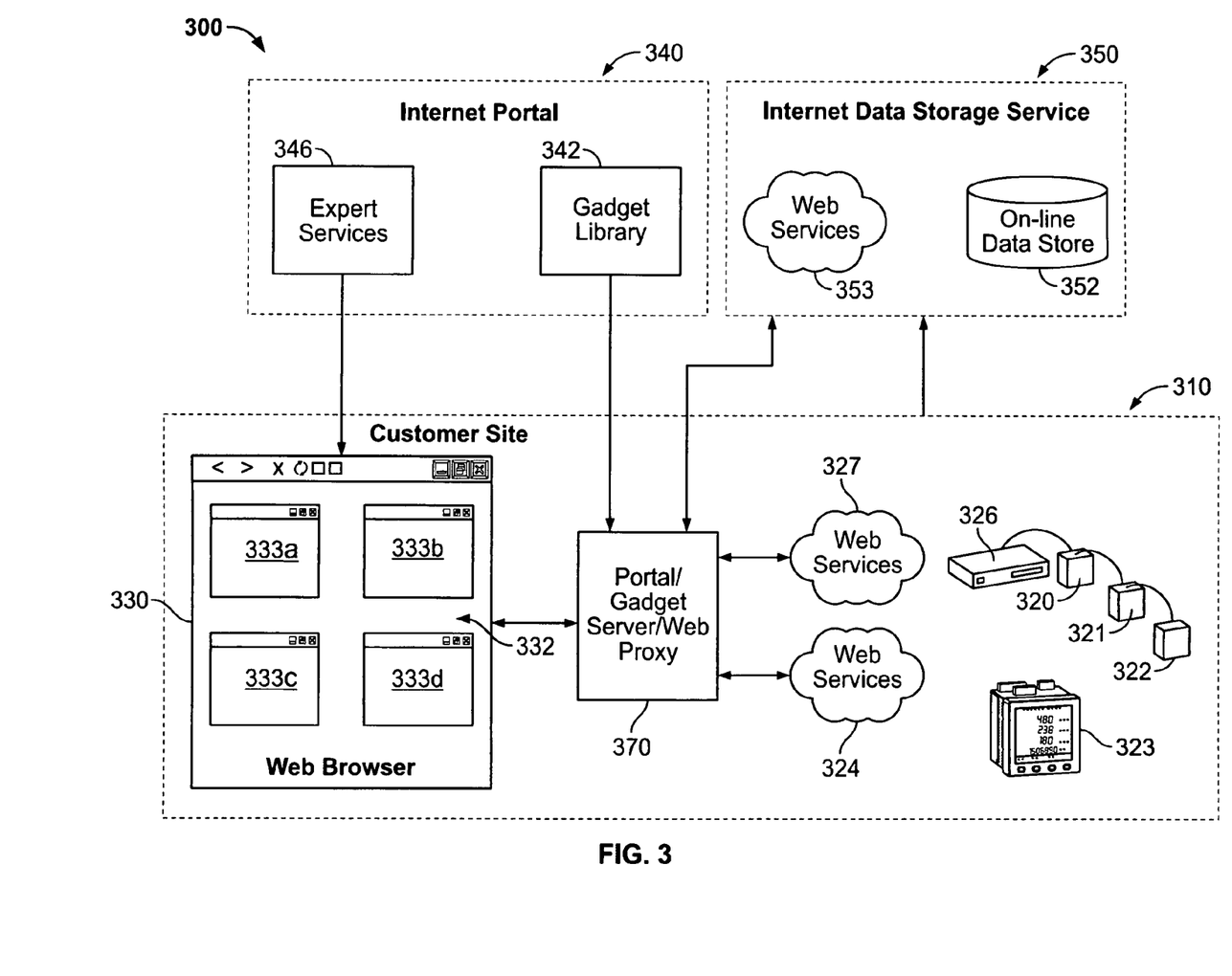
FIG. 3 is a functional block diagram of a system for presenting structured information based on monitored data in a utility monitoring system, which illustrates data flow between various components of the system in accordance with aspects herein.

According to some aspects, the software gadgets 133 can be stored in the computer hosting the web browser 130, in one of the plurality of IEDs 120, 121, 122, or 123, in a local server, in a remote server, in an internet portal, or in any combination thereof. For example, the software gadgets 133 can be stored in a gadget sever 370 as illustrated in FIG. 3.

Referring back to the internet portal 140 of FIG. 1, the internet portal 140 provides at least one function and/or service via a web page. The internet portal 140 can function as a point of access to specific information over a network, such as the Internet. The internet portal 140 can also be referred to as a web portal or more generally as a specialized web page or web site. The internet portal 140 serves as a centralized resource for the user of the web browser 130 to obtain various programs, applications, services, and/or software gadgets. As shown in FIG. 1, the user of the web browser 130 can access a gadget library 142 and/or expert services 146. To access the gadget library 142, for example, over the Internet, the user connects to the internet portal's 140 IP address and selects a software gadget for download. In some aspects, the user can download the software gadget for free or alternatively the user may have to pay for the download. The user can download the software gadget to the user's local computer (e.g., computer 231 of FIG. 2), to one of the plurality of IEDs 120, 121, 122, 123, to a server (e.g., proxy server 370 of FIG. 3), or to any other device coupled to the network (e.g., customer network 260 of FIG. 2). In other aspects, through the web browser 130, the user can execute and display a particular software gadget from the gadget library 142 without having to download the software gadget.

The internet data storage service 150 includes an on-line data store 152 and web services 153. The internet data storage service 150 is connected to the customer site 110 over the Internet. In other aspects, the internet data storage service 150 can be a data storage service located locally within the customer site 110 (e.g., data storage service 250 of FIG. 2). The web services 124, 127 of the Ethernet-enabled IED 123 and the gateway 126 are configured to expose the monitored data to the network, and the web services 153 of the on-line data store 152 is configured to extract that monitored data from the structured data produced by the web services 124, 127. Specifically, the on-line data store 152 receives structured data, which is derived from the monitored data generated within the plurality of IEDs 120, 121, 122, and 123. According to some aspects, the IEDs 120, 121, 122, and 123 regularly send the monitored data to the internet data storage service 150 for storage. Alternatively, only one or more IEDs send monitored data to the internet data storage service 150 regularly or at predetermined intervals.

In some aspects, a software gadget (e.g., software gadget 133a) can automatically discover available web services of a data storage service or the software gadget can be pointed through the setup mode to a data storage service, as described above. As illustrated in FIG. 1, the software gadgets 133 connect with the web services 153 of the on-line data store. Once the software gadgets 133 are connected with, or pointed to, the internet data storage service 150, the software gadgets 133 can receive the structured data being stored therein and manipulate that structured data to produce structured information. The structured data exposed by the web services 153 is the same structured data received by the web services 153 over the network (e.g., customer network 260 of FIG. 2) from the web services 124, 127 of the Ethernet-enabled IED 123 and the gateway 126, respectively. Alternatively, the web services 153 can expose monitored data being stored therein to the network. Once requested, the web services 153 can convert the monitored data into structured data for transmission to the requester (e.g., software gadget 133a).

Figure 2:
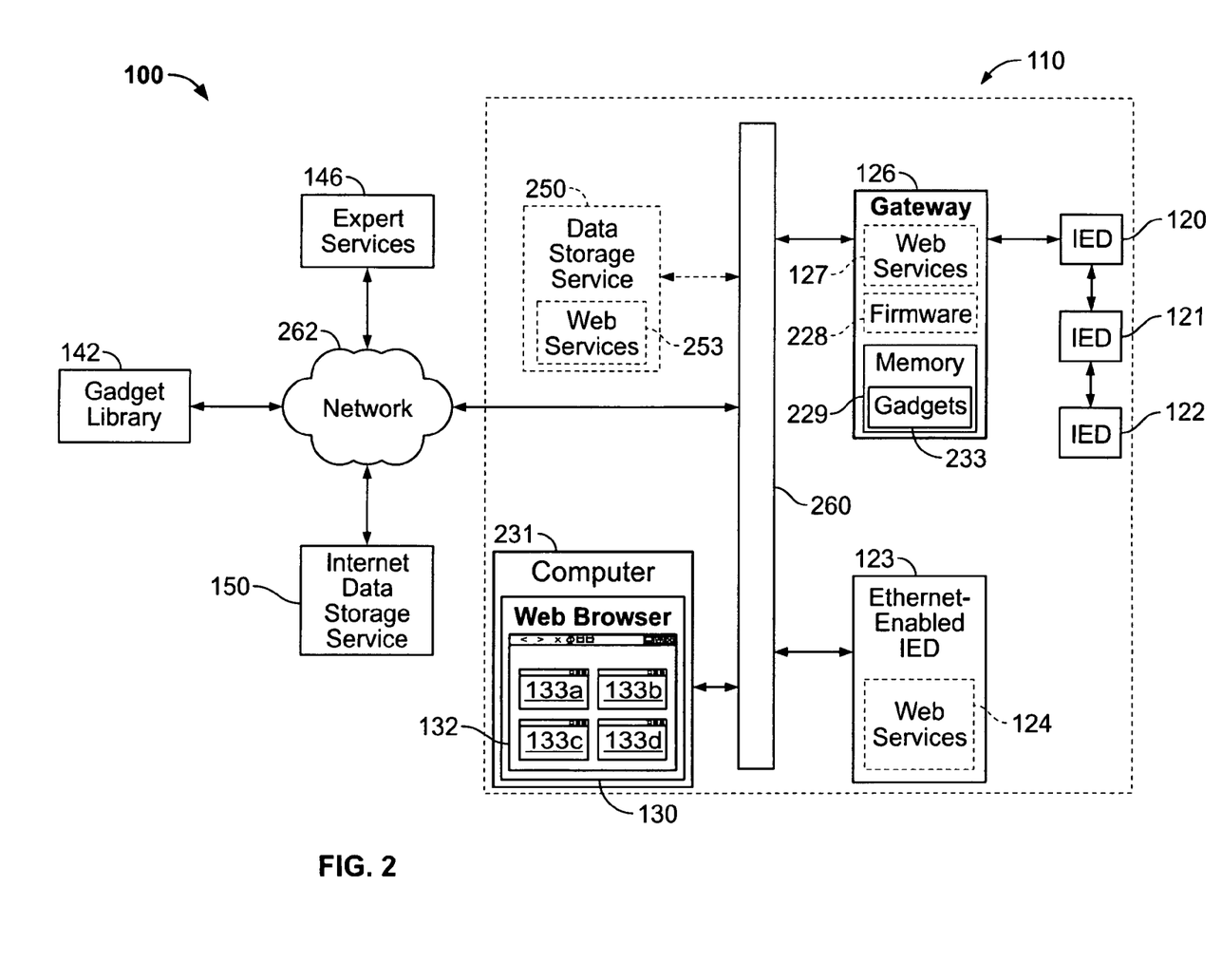
FIG. 2 is a functional block diagram that illustrates the connections among the various components of the system of FIG. 1.

Now turning to FIG. 2, a functional block diagram of the system 100 illustrates the connections among the various components of the system 100. The system 100 includes the customer site 110. The customer site 110 is connected to an external network 262, which is the Internet. The network 262 provides a communication path between the customer site 110 and various external services, servers, web sites, web pages, etc. Specifically, the network 262 provides a communication path between the customer site 110 and the gadget library 142, the expert services 146, and the internet data storage service 150, all of which are described above in relation to FIG. 1. The physical link between the customer site 110 and the network 262 is a customer network 260. The customer network 260 is the backbone of the customer site 110 providing a physical means of interconnection between the various components of the customer site 110. Specifically, the customer site 110 physically includes various components including, but not limited to, the plurality of IEDs 120, 121, 122, and 123, the gateway 126, a computer 231, and an optional data storage service 250, where the customer network 260 provides the backbone for connecting all of the above. The customer network 260 is typically a private or public local area network ("LAN"). Other types of customer networks are contemplated.

The gateway 126 includes the web services 127, firmware 228, and a memory 229. According to some aspects, the memory 229 of the gateway 127 can store one or more software gadgets 233. In these aspects, the gateway 127 acts as a web server that posts the structured information to an embedded web page hosted by the gateway 127. The user can view the embedded web page on the web browser 130 and manipulate the software gadgets 233 therein. Alternatively, the user can download the software gadgets 233 from the gateway 126 to the computer 231 to be executed locally there. In these alternative aspects, the computer 231 hosts the software gadgets 233 and can point a particular software gadget 233 to one of the plurality of IEDs 120, 121, 122, and 123 within the customer site 110.

The data storage service 250 is similar to the internet data storage service 150 described above; however, the data storage service 250 is located within the customer site 110. The data storage service 250 can be optionally connected to the customer network 260 to add additional storage for long term storage of historical-type monitored data. For example, the IEDs 120, 121, 122 do not typically contain a large amount of memory. Thus, these IEDs 120-122 can be configured to periodically transmit all or some of their monitored data (e.g., historical data) to the gateway 126, which converts the monitored data into structured data via the web services 127, which puts the corresponding structured data onto the customer network 260. The web services 253 of the data storage service 250 is configured to receive the structured data derived from the monitored data of the IEDs 120-122 and store the same. As described above in relation to the internet data storage service 150, the software gadgets 133, 233 can connect with the web services 253 of the data storage service 250. Once the software gadgets 133, 233 are connected with, or pointed to, the data storage service 250, the software gadgets 133, 233 can receive the structured data through the web services 253 and manipulate that structured data to produce structured information.

In some aspects, there are no software gadgets 133, 233 within the customer site 110. In these aspects, the user can download one or more software gadgets 133 from the gadget library 142. The user can log into the gadget library 142 using an login name and a password. Once logged into the gadget library 142, the user can download software gadgets 133 on the computer 231, the gateway 126, the Ethernet-enabled IED 123, and/or a server (e.g., proxy server 370 of FIG. 3) for use in producing structured information based on the monitored data derived in the IEDs of the customer site 110.

Now turning to FIG. 3, a system 300 for presenting structured information via software gadgets is generally shown. The system 300 includes a customer site 310, an internet portal 340, and an internet data storage service 350. FIG. 3 differs from FIG. 1 in that FIG. 3 introduces a proxy server 370 between the web browser and the web services of the web-compatible devices connected to the IEDs. The proxy server 370 is preferred in systems where the IEDs are scattered across multiple IP domains.

The internet portal 340 and the internet data storage service 350 are similar to or the same as the internet portal 140 and the internet data storage service 150 of system 100. Specifically, the internet portal 340 includes a gadget library 342 and expert services 346. The internet data storage service 350 includes an on-line data store 352 and web services 353. The web services 353 communicate with the customer site 310 in the same manner as the web services 153 communicate with the customer site 110.

The customer site 310 is similar to the customer site 110, except the customer site 310 includes a portal/gadget server/web proxy 370 ("proxy server"). The proxy server 370 can also be referred to as a web proxy. A user of a web browser 330 manipulates software gadgets 333 in a web page 332. In some aspects, the user requests that a particular software gadget (e.g., software gadget 333a) connect to one or more IEDs (e.g., IED 320, IED 321) to receive structured data through the web services (e.g., web services 327) of a gateway 326. In other words, the user sends a request to the IED via the gateway 326 for the structured data corresponding to the monitored data of the IED. This request for structured data first passes through the proxy server 370, which then forwards the request to the web services 327 of the gateway 326.

In some aspects, the user requests structured data from more than one IED. For example, the user can request structured data, to be manipulated in software gadget 333*c*, from IED 322 and Ethernet-enabled IED 323. In this example, a single request for structured data is sent to the proxy server 370. The proxy server 370 then forwards the request onto the web services 327 of the gateway 326 and onto web services 324 of the Ethernet-enabled IED 323. The respective web services 327, 324 receive the request and transmit the requested structured data to the proxy server 370, which forwards the structured data to the requesting user for manipulation in the software gadget 333*c*.

In addition to forwarding requests, in some aspects, the proxy server 370 can also act as a content filter to provide administrative control over the content that may be relayed through the proxy server 370. In these aspects, the proxy server 370 can filter out certain unacceptable content. The proxy server 370 can also support user authentication to control access to, for example, the structured data. Use of the proxy server 370 is beneficial in systems (e.g., system 300) that might suffer from cross-domain scripting vulnerability or cross-site scripting vulnerability. For example, if the system 300 contains IEDs in different domains, the addition of the proxy server 370 adds security to the customer site 310.

Figure 4:
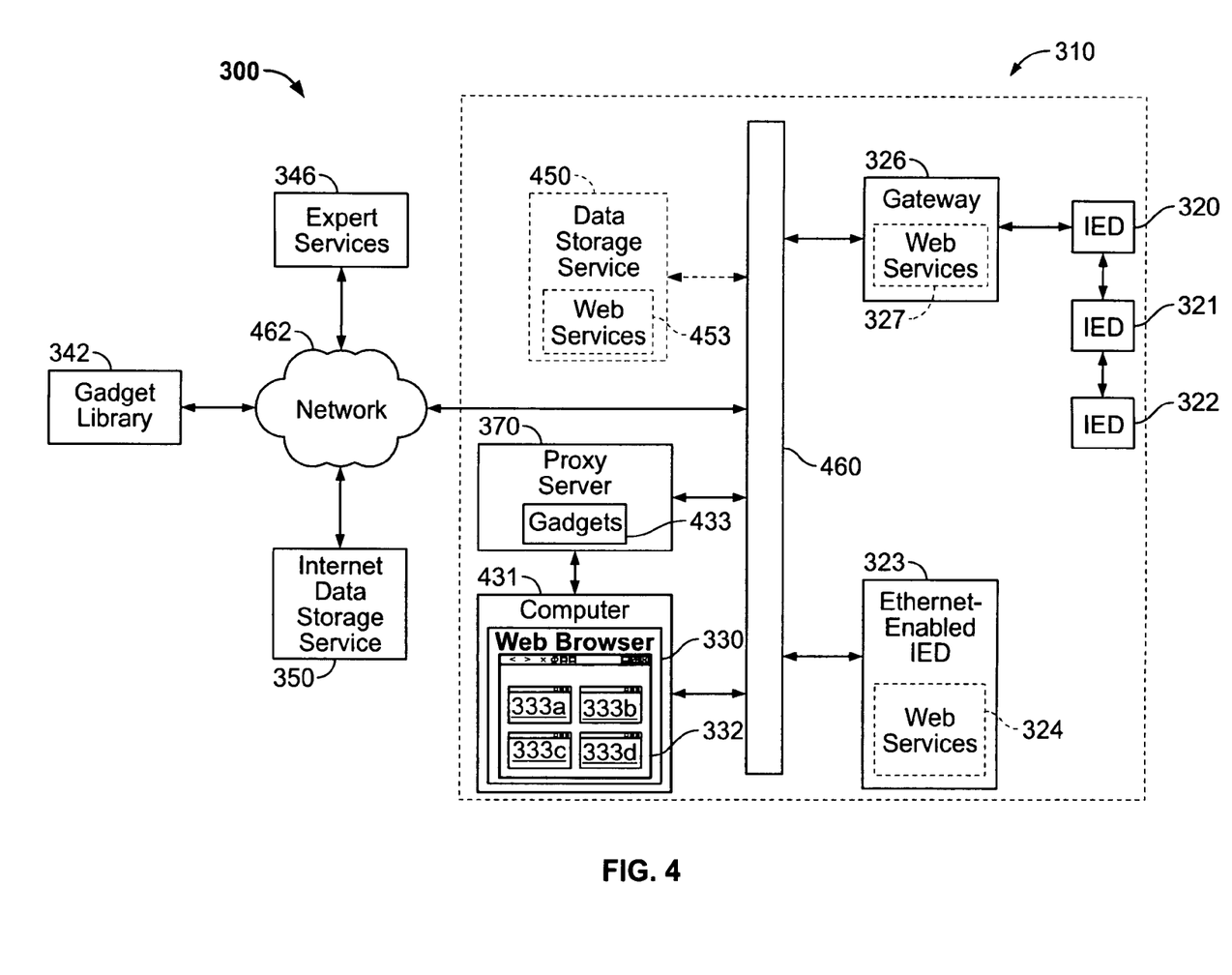
FIG. 4 is a functional block diagram that illustrates the connections among the various components of the system of FIG. 3.

Now turning to FIG. 4, a functional block diagram of the system 300 illustrates the connections among the various components of the system 300. The system 300 includes the customer site 310. The customer site 310 is connected to network 462, which is the Internet. The network 462 provides a communication path between the customer site 310 and the gadget library 342, the expert services 346, and the internet data storage service 350, all of which are described above in relation to FIG. 3. The physical link between the customer site 310 and the network 462 is a customer network 460. The customer network 460 is the same as or similar to the customer network 260 of system 100.

The proxy server 370 is connected between the customer network 460 and a computer 431. The computer 431 hosts the web browser 330, which displays the web page 332. In addition to connecting to the proxy server 370, the computer directly connects to the customer network 460. Alternatively, the computer 431 can be solely connected to the customer network 460 through the proxy server 370. It is contemplated that in some aspects, the proxy server 370 can be connected to a plurality of computers.

Requests for structured data are sent from the software gadgets 333 displayed on the web browser 330, via the computer 431. These requests pass through the proxy server 370 and are forwarded over the customer network 460 to specific devices (e.g., the gateway 326, the Ethernet-enabled IED 323). Specifically, these requests are received by the web services 327, 324 of the gateway 326 and/or the Ethernet-enabled IED 323. The web services 327, 324 transmit the structured data over the customer network 460 to the proxy server 370. The proxy server 370 receives this structured data and forwards the structured data to one or more requesting software gadgets 333, 433 for manipulation into structured information. Requests for structured data can also be forwarded over the network 462 to the internet data storage service 350, which transmits data in the same or similar manner as internet data storage service 150. Similarly, requests for structured data can be forwarded over the customer network 460 and received in web services 453 of a data storage service 450.

In some aspects, the proxy server 370 functions also as a gadget server for hosting one or more software gadgets 433. The software gadgets 433 can be preloaded, downloaded, and/or manually loaded into the proxy server 370. Alternatively, the software gadgets 333 can be hosted on the computer 431, the gadget library 342, the gateway 326, or another server on the customer network 460 or the network 462. From the computer 431, the user can access and point software gadgets 433 in the proxy server 370 to one or more IEDs, the internet data storage service 350, the data storage service 450, or any combination thereof. For example, the user views the structured information presented by software gadgets 433, stored on the proxy server 370, as text and/or graphics in the web page 332. The software gadgets 433 can automatically discover the IEDs 320-323 and data storage service 450 on the customer network 460 and/or the network 462 (e.g., internet data storage service 350). Additionally, the user can manually point one or more of the software gadgets 433 to the IEDs 320-323 and data storage services 350, 450 in the system 300. Once the one or more software gadgets 433 are setup, the software gadgets 333, 433 can receive the structured data, derived from the monitored data, and manipulate that structured data to produce structured information.

Figure 5:
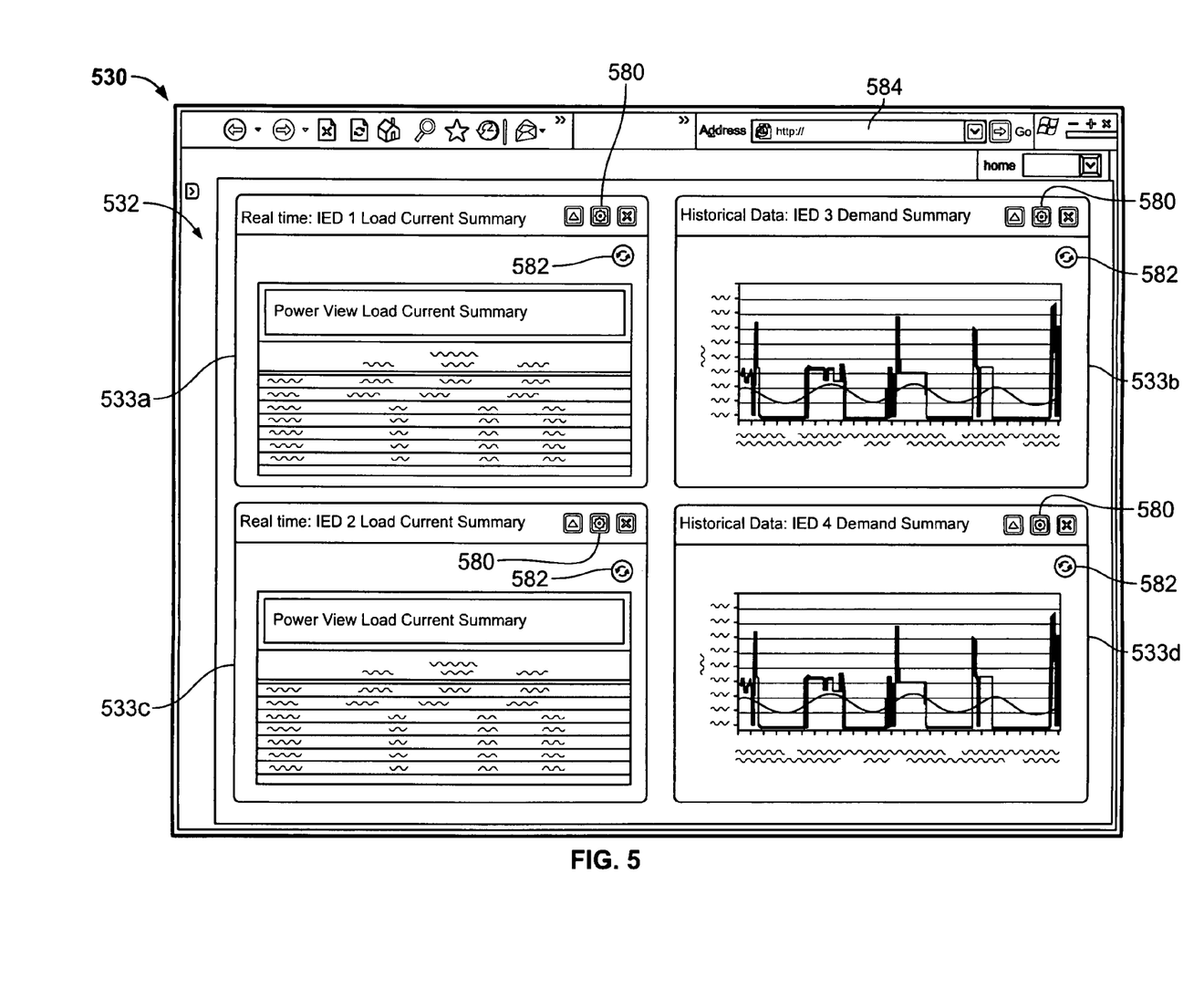
FIG. 5 is a front view of a web browser displaying an example web page that includes a plurality of software gadgets in accordance with aspects herein.

Now turning to FIG. 5, a web browser 530 is shown according to some aspects. The web browser 530 is the same as or similar to the web browsers 130, 330. The web browser 530 displays a web page 532 containing four software gadgets 533*a-d*. The user accesses the web page 532 by conventionally inserting the IP address or URI 584 of the hosting computer into the web browser 530. The web browser 530 loads the web page 532 according to a user's customized viewing system. The customized viewing system is a custom arrangement and organization of a variety of software gadgets. The customized viewing system, as shown in FIG. 5, can include two software gadgets 533*a,c* on the left half of the web page 532 displaying real-time load current summaries and two software gadgets 533*b,d* on the right half of the web page 532 displaying historical demand summaries, for example. Various other customized viewing systems are contemplated, based on the user's needs and desires as related to utility monitoring.

The software gadgets 533*a-d* are each pointed to a different IED in the illustrated example. Alternatively, any of the software gadgets 533*a-d* can be pointed to two or more of the same or different IEDs. To point a software gadget to one or more IEDs, the user selects the setup button 580 on a software gadget of interest. For example, the user can select the setup button 580 of the software gadget 533*b* and point the software gadget 533*b* to the IP address or URI corresponding to IED 3. Similarly, the software gadget 533*a*, as shown, is pointed to IED 1, the software gadget 533*c* is pointed to IED 2, and the software gadget 533*d* is pointed to IED 4. Once the software gadgets 533*a-d* are setup, they can receive and manipulate structured data derived from respective monitored data measured by the IEDs 1-4. Specifically, the software gadgets 533*a-d* can analyze the structured data to produce structured information. The structured information is preferably in an XML format that is interpreted by the web browser 530 and displayed to a user for viewing and/or further manipulation.

The software gadgets 533*a-d* also includes a refresh button 582. The refresh button 582 allows the user to refresh the data shown in a particular software gadget. For example, the user can press the refresh button 582 of software gadget 533*b* to cause the software gadget 533b to receive new and/or additional structured data from web services of the IED 3 and/or from web services of a data storage service (e.g., internet data storage services 150, 350 and data storage services,250, 450). In other aspects, the software gadgets 533a-d can be auto- or manually configured to auto-refresh periodically, without user intervention, in addition to or in lieu of being manually refreshed.

As described above, the user can edit, copy, duplicate, delete, move, rearrange, or setup any of the software gadgets 533 displayed in the web browser 530. For example, the user can press the setup button 580 of the software gadget 533b to change the address pointed to by the software gadget 533b from IED 3 to IED 2. Similarly, the user can point the software gadget 533b to a plurality of IEDs (e.g., IEDs 1-4). The user can also create or download additional software gadgets from a gadget library (e.g., gadget library 142, 342). Once downloaded, the additional software gadgets appear on the web page 532 ready for setup by the user, where the user can manually point the downloaded software gadgets to one or more IEDs. Alternatively, the downloaded software gadgets can automatically discover IEDs in a customer site (e.g., customer site 110, 310).

Preferably, all of the web services shown in FIGS. 1-5 are IP-compatible.

Figure 6:
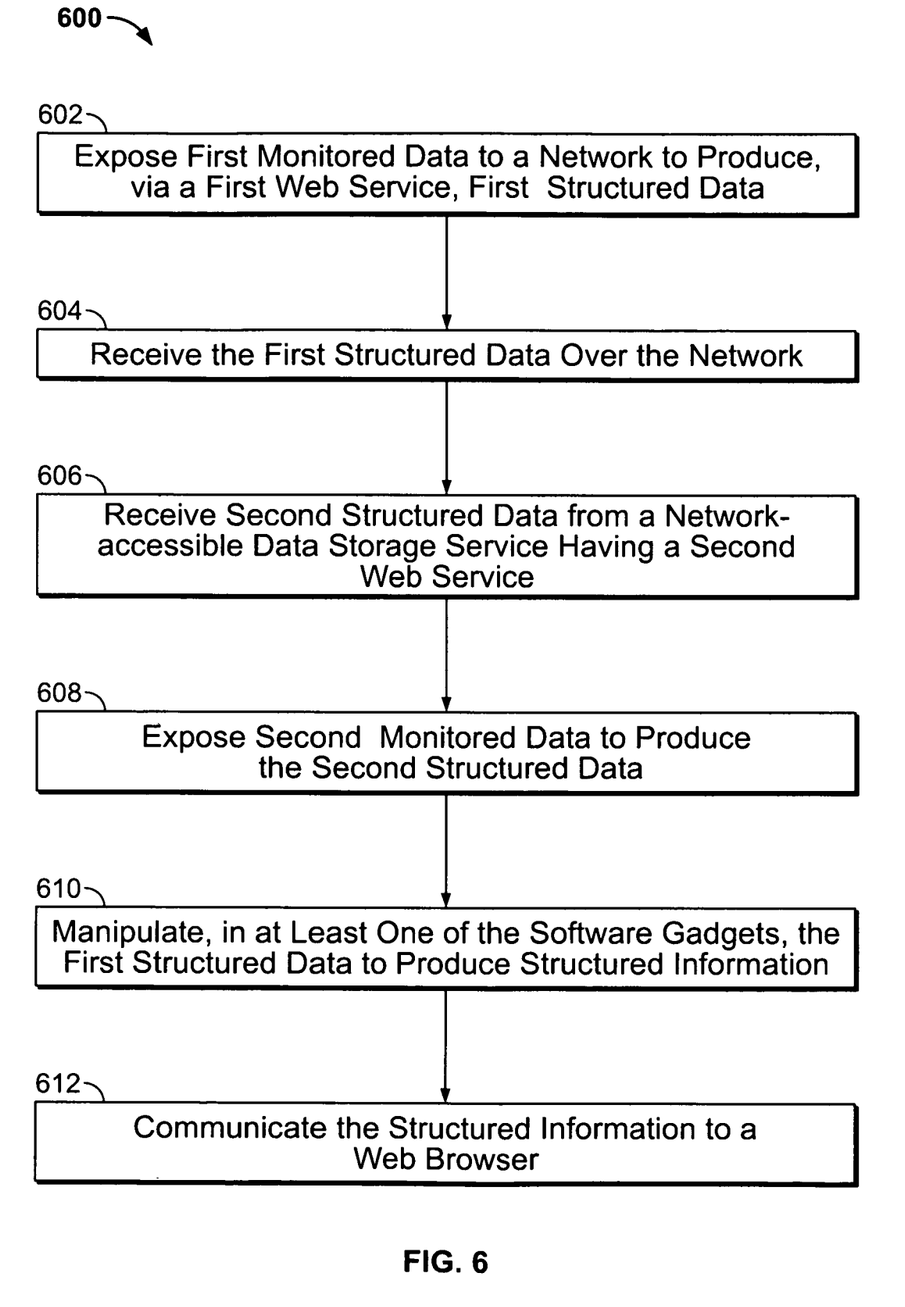
FIG. 6 is a flow chart of an example method of presenting information in a web page in accordance with aspects herein.

Now turning to FIG. 6, a flow chart (600) of a method of presenting information, via software gadgets, in a web page is illustrated in accordance with some aspects. The flow chart 600 can be applied to any of the foregoing FIGS. 1-5, and the blocks in FIG. 6 need not necessarily be performed in the order shown.

A web service exposes first monitored data to a network (602). The first monitored data is indicative of characteristics (such as, in the case of electricity, voltage, current, or power) of a utility (such as electricity, or any of WAGES mentioned above) measured by a first IED in a utility monitoring system. The utility monitoring system can be a power monitoring system where the monitored data can include, but is not limited to, values indicative of current, voltage, or power measured by the first IED. The web service converts the first monitored data into first structured data. The first structured data is based on the first monitored data and sent over the network in a structured format, such as XML. The software gadgets can request and receive the first structured data over the network (604) in the structured format.

The software gadgets can also request and receive second structured data from a network-accessible data storage service (606). The data storage service has a web service that exposes second monitored data (608). The second monitored data can be the same as or different than the first monitored data. In some aspects, the first monitored data is from a first IED and the second monitored data is from a second IED. In other aspects, the first monitored data is real-time monitored data and second monitored data is historical monitored data from the same and/or different IEDs. In some aspects, the web service of the data storage service converts the second monitored data into the second structured data (608). In other aspects, the web service of the data storage service merely sends the second structured data over the network.

The software gadgets manipulate the structured data to produce structured information (610). The structured information is based on the first monitored data, the second monitored data, or both. Manipulating the structured data may entail formatting the structured data into a chart or a graph and/or organizing the structure data. Manipulating may also entail analyzing the structured data to produce representative information (such as displaying the monitored data in a tabular format or in a graphical chart), preventative information (such as a recommendation to ameliorate a voltage sag), and/or predictive information (such as a recommendation to maintain a motor to avoid a potential electrical event in the future). For example, the software gadgets may manipulate the structured data to produce information representing the average current value flowing through a particular IED. For another example, the software gadgets may manipulate the structured data to produce a warning that a particular IED needs servicing or maintenance. Users can be presented with an option, via the software gadget, to purchase an analysis for service based on the structured information presented on the software gadget. For example, when the software gadget recommends that a motor be maintained, the software gadget can present the user with an option to purchase a motor maintenance service offered by the provider of the software gadget.

The software gadgets communicate the structured information to a web browser for display in a web page by the web browser (612). Referring to the above average current example discussed above, the software gadget displays the average current data to a user of the web browser through a graphical representation on the web page.

Any of the software (such as the software gadgets) or methods described herein can include machine readable instructions for execution by: (a) a processor, (b) a controller, and/or (c) any other suitable processing device. It will be readily understood that the devices 123, 126, 140, 150, 231, 250, 326, 323, 340, 350, 370, 431, 450 can include such a suitable processing device. Any algorithm, software, or method disclosed herein can be embodied in software stored on a tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it may be implemented by an application specific integrated circuit (ASIC), a programmable logic device (PLD), a field programmable logic device (FPLD), discrete logic, etc.). Also, some or all of the machine readable instructions represented in any flowchart depicted herein may be implemented manually. Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

While particular aspects, embodiments, and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A method of presenting structured information, via software gadgets, based on monitored data in a power monitoring system, comprising:
exposing first monitored data to a network to produce, via a first web service, first structured data, the first monitored data being indicative of real-time values of a characteristic of a utility measured by a first intelligent electronic device (IED) in the power monitoring system, the first structured data representing the first monitored data in a structured format, the characteristic including current, voltage, or power, wherein the first web service converts the first monitored data into the first structured data;

receiving, by a first of the software gadgets, the first structured data over the network;

receiving, by a second of the software gadgets, second structured data from a network-accessible data storage service having a second web service that exposes second monitored data to produce the second structured data, the second monitored data being indicative of historical values of the characteristic of the utility measured by the first IED or a second IED in the power monitoring system and communicated by the first or the second IED to the network-accessible data storage service, the second structured data representing the second monitored data in the structured format;

prior to receiving the second structured data, transmitting at least a portion of the second monitored data over the network and storing the at least a portion of the second monitored data in the network-accessible data storage service;

manipulating, in the first software gadget, the first structured data and manipulating, in the second software gadget, the second structured data to produce structured information that is representative of a real-time summary based on the real-time values of the first monitored data and a historical summary based on the historical values of the second monitored data;

communicating the structured information from the first and the second software gadgets to a web browser for display in a web page by the web browser, wherein the manipulating includes formatting the first monitored data and the second monitored data for display in a single web page by the web browser;

presenting by the web browser the structured information via the first software gadget and via the second software gadget, wherein the first IED or the second IED is a power meter, and wherein the first or the second software gadget is hosted in a gateway operatively connected to the first IED or the second IED; and in response to adding a new IED to the power monitoring system, at least one of the first or the second software gadgets automatically discovering the newly added IED.

2. The method of claim 1, wherein the manipulating includes analyzing the first monitored data, or the second monitored data, or both to produce the structured information.

3. The method of claim 1, wherein the manipulating includes formatting the first monitored data or the second monitored data, or both for display in the web page by the web browser, and wherein the first structured data is formatted according to an extensible markup language (XML).

4. The method of claim 1, wherein the first software gadget is a technical support gadget, a data backup gadget, a graphical display gadget, a report gadget, or a trend gadget.

5. The method of claim 1, wherein the other of the first software gadget or the second software gadget is hosted in the first IED, in the second IED, in a proxy server remote from the first IED and the second IED, or in a computer that runs the web browser.

6. The method of claim 1, wherein the network is a local area network (LAN) or a wide area network (WAN).

7. The method of claim 1, wherein the network is the Internet.

8. The method of claim 1, wherein the first or the second software gadget automatically discovers the network-accessible data storage service and other IEDs in the power monitoring system.

9. The method of claim 1, wherein the automatically discovering includes connecting automatically to the newly added IED over the network.

10. A system for presenting structured information, via software gadgets, based on monitored data in a power monitoring system, comprising:
   one or more processors and a memory;
   a device including a first web service programmed to expose to a network first monitored data indicative of real-time values of a characteristics of a utility measured by a first intelligent electronic device (IED) in the power monitoring system to produce first structured data, the first web service converting the first monitored data into the first structured data, wherein the characteristics include current, voltage, or power;
   a gadget library storing a plurality of software gadgets, a first of the plurality of software gadgets being connected over the network to the first web service to receive therefrom the first structured data; and
   a network-accessible data storage service communicatively coupled to the device, the data storage service being programmed to receive over the network and store second monitored data indicative of historical values of characteristics of the utility measured by the first IED or a second IED in the power monitoring system and transmitted to the network-accessible data storage service, the network-accessible data storage service including a second web service to expose the second monitored data to produce second structured data that is network compatible,
   wherein the one or more processors is programmed to:
      connect a second of the plurality of software gadgets to the second web service to receive the second structured data,
      manipulate, in the first software gadget, the first structured data and manipulate, in the second software gadget the second structured data to produce corresponding structured information that is representative of a real-time summary based on the real-time values of the first monitored data and a historical summary based on the historical values of the second monitored data,
      communicate the structured information from the first and the second software gadgets to a web browser for display in a web page by the web browser,
      format the first monitored data and the second monitored data for display in the web page,
      present the structured information in the web browser via the first and second software gadgets, wherein the first IED or the second IED is a power meter, and wherein the first or the second software gadget is hosted in a gateway operatively connected to the first IED or the second IED, and
      in response to adding a new IED to the power monitoring system, automatically discover the newly added IED by the first software gadget or by the second software gadget.

11. The system of claim 10, wherein the device is a gateway or an Ethernet-enabled IED.

12. The system of claim 10, further comprising a proxy server connected between the device and the gadget library, the proxy server being programmed to connect the first or the second software gadget to the first IED and to the second IED.

13. The system of claim 10, wherein the manipulating the first structured data includes analyzing the first monitored data, or the second monitored data, or both to produce the corresponding structured information.

* * * * *